United States Patent
Ura et al.

[11] Patent Number: 6,112,826
[45] Date of Patent: Sep. 5, 2000

[54] AGRICULTURAL TRACTOR

[75] Inventors: Takeshi Ura, Nara; Akio Inamori, Izumi, both of Japan

[73] Assignee: Kubota Corporation, Japan

[21] Appl. No.: 09/268,978

[22] Filed: Mar. 16, 1999

[30] Foreign Application Priority Data

Mar. 18, 1998 [JP] Japan .................................. 10-068085

[51] Int. Cl.⁷ .......................... B62D 17/34; B60K 17/354
[52] U.S. Cl. ............................................ 172/255; 180/233
[58] Field of Search .................................. 172/2, 3, 4, 7, 172/255; 180/233, 248, 249; 74/745, 740, 6.24

[56] References Cited

U.S. PATENT DOCUMENTS

| 4,792,009 | 12/1988 | Iritani ....................................... 180/233 |
| 4,856,611 | 8/1989 | Teraoka et al. ........................... 180/233 |
| 4,887,686 | 12/1989 | Takei et al. ........................... 180/233 X |
| 5,251,719 | 10/1993 | Eto et al. ............................... 180/248 X |
| 5,279,384 | 1/1994 | Shibahata et al. ....................... 180/248 |
| 5,293,956 | 3/1994 | Onishi ..................................... 180/233 |
| 5,341,893 | 8/1994 | Fukui et al. .......................... 180/248 X |
| 5,752,211 | 5/1998 | Takasaki et al. ..................... 180/248 X |

FOREIGN PATENT DOCUMENTS

| 0495530 | 2/1974 | Japan . |
| 53-47631 | 4/1978 | Japan . |
| 63-110030 | 5/1988 | Japan . |
| 0732896 | 2/1995 | Japan . |

*Primary Examiner*—Robert E. Pezzuto
*Attorney, Agent, or Firm*—Webb Ziesenheim Logsdon Orkin & Hanson, P.C.

[57] ABSTRACT

This invention relates to controls of an agricultural tractor having a rotary cultivating mode and a draft control mode for performing a plowing operation. A conventional tractor has a controller for accelerating front wheels to be faster than rear wheels when the front wheels are steered to a predetermined reference angle. Such control is effected only in the rotary cultivating mode. In the agricultural tractor according to this invention, different reference angles are automatically set for the rotary cultivating mode and draft control mode. In addition, different reference speeds are set for the rotary cultivating mode and draft control mode. When the tractor runs faster than the reference speeds, the front wheels are prevented from becoming faster than the rear wheels even if the front wheels are steered to the reference angles.

17 Claims, 7 Drawing Sheets

AGRICULTURAL TRACTOR

BACKGROUND OF THE INVENTION

1. Field of the Invention

This invention relates to an agricultural tractor for carrying out a rotary cultivating operation and a plowing operation.

2. Description of the Related Art

An agricultural tractor includes a front wheel change speed device switchable between a standard state for driving dirigible front wheels at substantially the same speed as rear wheels, and an accelerating state for driving the front wheels at a higher speed than the rear wheels. A proposal has been made to provide the tractor with a front wheel speed control device for automatically switching the front wheel change speed device from the standard state to the accelerating state upon detection of the front wheels being steered in excess of a predetermined reference angle. Such a construction has been put to practical use as effective for enabling the tractor to make small turns near ridges without roughening the field.

In connection with this front wheel speed control, a technique has been developed for inhibiting the front wheel change speed device from switching to the accelerating state when the tractor runs faster than a predetermined reference speed. This prevents a small turn being made when the tractor is traveling at high speed.

Conditions for the above automatic front wheel speed control and inhibition of front wheel acceleration are determined based on a cultivating operation, which is a main operation, carried out with a rotary cultivator. These control and inhibition are canceled when carrying out an operation other than the rotary cultivating operation, such as a plowing operation.

SUMMARY OF THE INVENTION

A primary object of this invention is to provide an agricultural tractor for effectively performing an automatic front wheel change speed control or other accompanying controls during a turn for different operations modes such as a rotary cultivating operation and drag type operations such as a plowing operation.

An agricultural tractor according to this invention comprises an engine, rear wheels driven by the engine, dirigible front wheels drivable by the engine, a front wheel change speed device switchable between a standard state for driving the front wheels at a substantially equal speed to the rear wheels, and an accelerating state for driving the front wheels at a higher speed than the rear wheels, and an operating mode selecting device for selecting from a plurality of operating modes. The examples of the operating modes include a draft control mode, a rotary cultivating mode and a position control mode.

Further, in the agricultural tractor according to this invention, to fulfill the above object, a reference angle or a reference speed or both is/are set to different values for different modes.

As one characterizing feature of this invention, for example, a reference angle setting device may be provided which is operable, in response to a mode switching operation of the operating mode selecting device, for automatically selecting a first reference angle corresponding to the rotary cultivating mode or a second reference angle corresponding to the draft control mode. A front wheel change speed control device may be provided which is operable, upon detection of the front wheels being steered in excess of a selected one of the first reference angle and the second reference angle, for switching the front wheel change speed device from the standard state to the accelerating state. With this construction, by setting beforehand a value suited to a rotary cultivating operation and a value suited to a plowing operation as reference angles for executing the front wheel change speed control, the different value suited to each mode is automatically selected when switching is made between the rotary cultivating mode and draft control mode. Thus, the front wheel change speed control is performed effectively adjacent ridges not only during a rotary cultivating operation but during a plowing operation under draft control.

In a preferred embodiment of this invention, the second reference angle corresponding to the draft control mode is set larger than the first reference angle corresponding to other operating mode such as the rotary cultivating mode. During a plowing operation in an unsmooth field, the tractor may have to change its running direction with the front wheels steered in excess of the reference angle for executing the front wheel change speed control in a rotary cultivating operation. Thus, the reference angle for executing the front wheel change speed control in the draft control mode selected for a plowing operation is set larger than the reference angle for the rotary cultivating mode. This measure precludes the possibility of the front wheels inadvertently accelerated when the tractor is steered to a large extent during a plowing operation. When the tractor is steered to a very large extent, the front wheel change speed control is executed to achieve a desired small turn.

Consequently, the front wheel change speed control may be executed effectively in a way suited to each operating mode during a rotary cultivating operation and a plowing operation under draft control.

Preferably, the tractor further comprises an auto up control device operable, upon detection of the front wheels being steered in excess of the selected reference angle, for automatically raising a working implement coupled to a rear position of the tractor to a non-operating height. This construction eliminates the need to raise the working implement manually when the tractor makes a turn.

To fulfill the object noted hereinbefore, the agricultural tractor preferably comprises a reference speed setting device operable, in response to a mode switching operation of the operating mode selecting device, for automatically selecting one of a first reference speed corresponding to the rotary cultivating mode and a second reference speed corresponding to the draft control mode, and a front wheel change speed restraining device operable, upon detection of a running speed of the tractor higher than a selected one of the first reference speed and the second reference speed, for inhibiting switching of the front wheel change speed device from the standard state to the accelerating state.

With this construction, by setting beforehand a value suited to the rotary cultivating operation and a value suited to the plowing operation as reference speeds for inhibiting the front wheel change speed control, the different value suited to each mode is automatically selected when switching is made between the rotary cultivating mode and draft control mode. Thus, the front wheel change speed control is inhibited effectively not only during a rotary cultivating operation but during a plowing operation under draft control.

Preferably, the first reference speed corresponding to the rotary cultivating mode is set higher than the second reference speed corresponding to the draft control mode. The tractor runs faster during a plowing operation than during a rotary cultivating operation, and may make a turn at a higher speed than the reference speed for inhibiting the front wheel change speed control in the rotary cultivating operation. Thus, for the draft control mode selected to perform a plowing operation, the reference speed for inhibiting the front wheel change speed control is set higher than the reference speed for the rotary cultivating operation. This precludes the possibility of the front wheel change speed control inadvertently inhibited when the tractor is steered at high speed during a plowing operation. When the tractor travels at a higher speed than during a plowing operation, the front wheel acceleration is inhibited to assure safe running.

Other features and advantages of this invention will be apparent from the following description of the embodiment to be taken with reference to the drawings.

DETAILED DESCRIPTION OF THE PREFERRED EMBODIMENT

Figure 1:
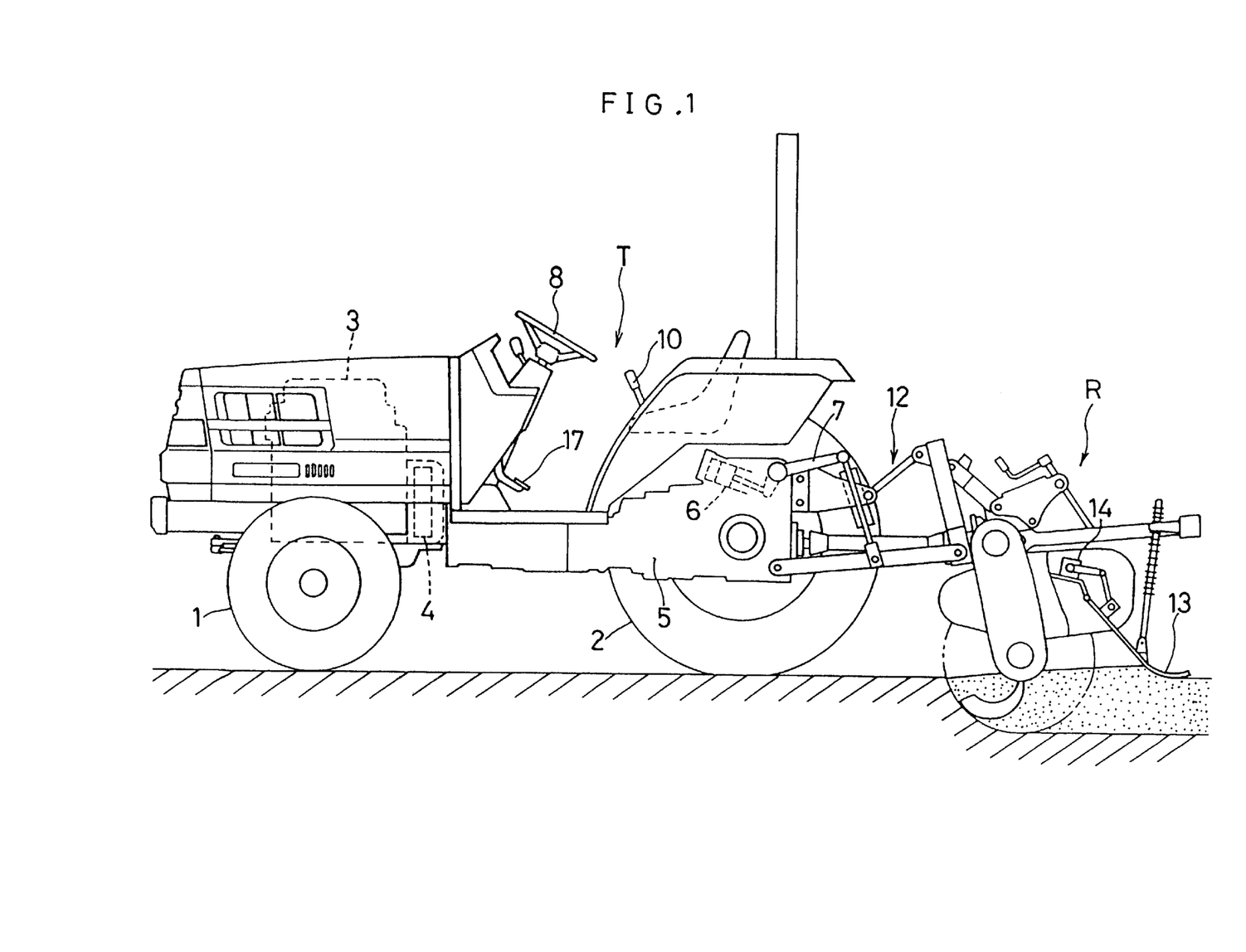
FIG. 1 is a side elevation of a tractor engaged in a rotary cultivating operation.
Figure 2:
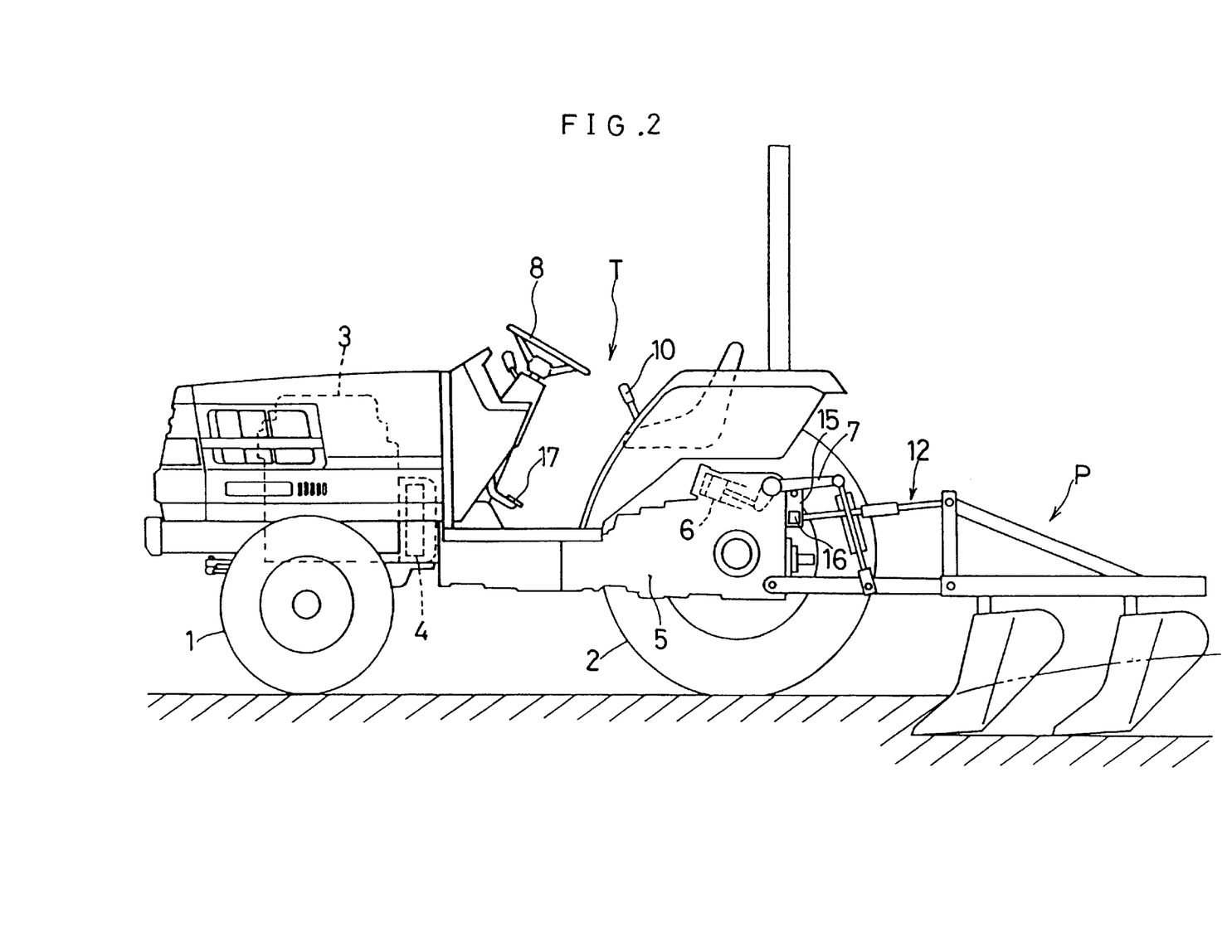
FIG. 2 is a side elevation of the tractor engaged in a plowing operation.

FIG. 1 shows an agricultural tractor engaged in a rotary cultivating operation. FIG. 2 shows the agricultural tractor engaged in a plowing operation. The tractor T includes a vehicle body with front wheels 1 and rear wheels 2 and having an engine 3 mounted in a front position thereof Power of the engine 3 is transmitted, through a main clutch 4 to a transmission case 5 disposed in a rearward position of the vehicle body. A pair of right and left lift arms 7 are connected to upper rear positions of the transmission case 5 to be vertically pivotable by a hydraulic lift cylinder 6. The vehicle body includes a steering wheel 8 and a driver's seat 9 arranged on a driving platform formed in a central region thereof. Further, a position lever 10 and a shift lever 11 are disposed laterally of the driver's seat 9 for controlling the lift arms 7 and for changing running speed, respectively. A main clutch pedal 17 is disposed in a leftward front region of the driving platform. A pair of right and left side brake pedals 18 are disposed in a rightward front region of the driving platform for braking the right and left rear wheels 2 independently of each other. A three-point link mechanism 12 is attached to the rear end of the tractor T to be vertically movable by the lift arms 7. A working implement such as a rotary cultivator R or a plow P (the latter being one example of drag type working implements) may be coupled to the three-point link mechanism 12.

As shown in FIG. 1, the rotary cultivator R has a rear cover 13 oscillatable about an axis x extending transversely of the vehicle body, and a potentiometer type cover sensor 14 for measuring a height above the ground (cultivating depth) of the rotary cultivator R based on an oscillating position of the rear cover 13. The three-point link mechanism 12 includes a top link bracket 15 having a draft sensor 16 for detecting a draft load acting on the plow P.

Figure 3:
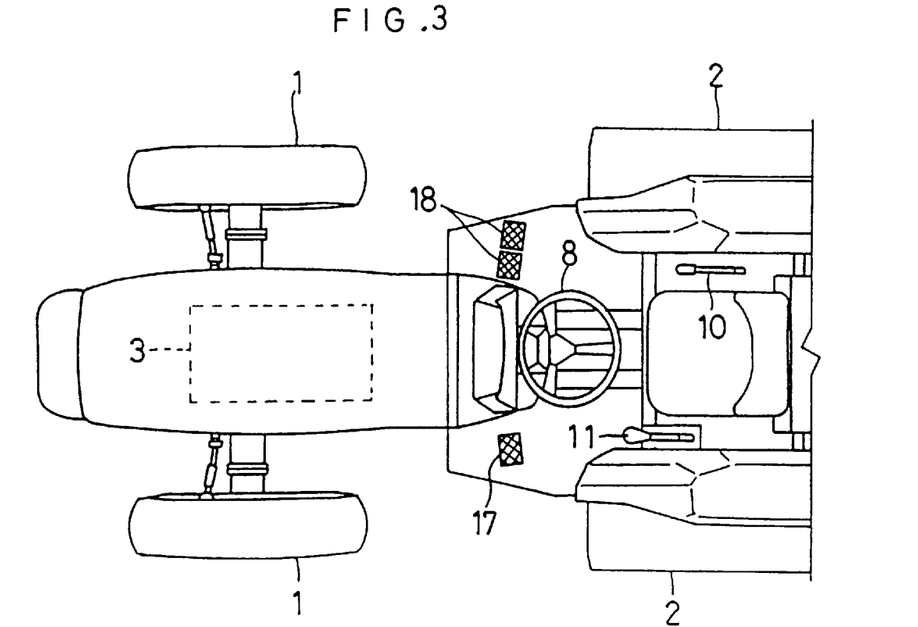
FIG. 3 is a plan view a portion of the tractor.
Figure 4:
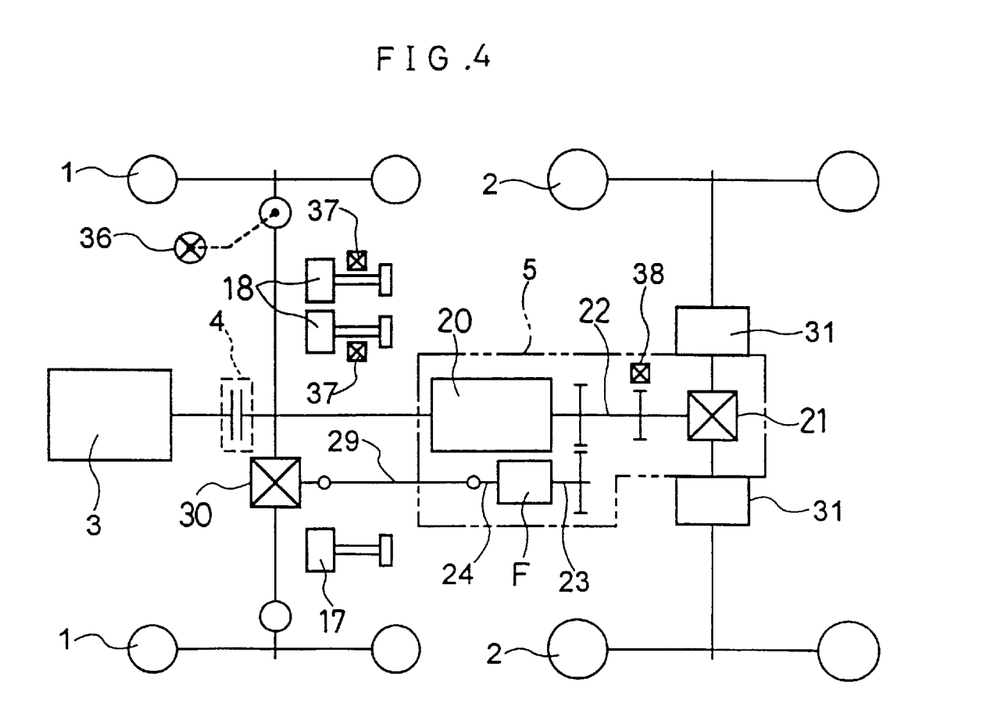
FIG. 4 is a schematic view of a transmission system of the tractor.
Figure 5:
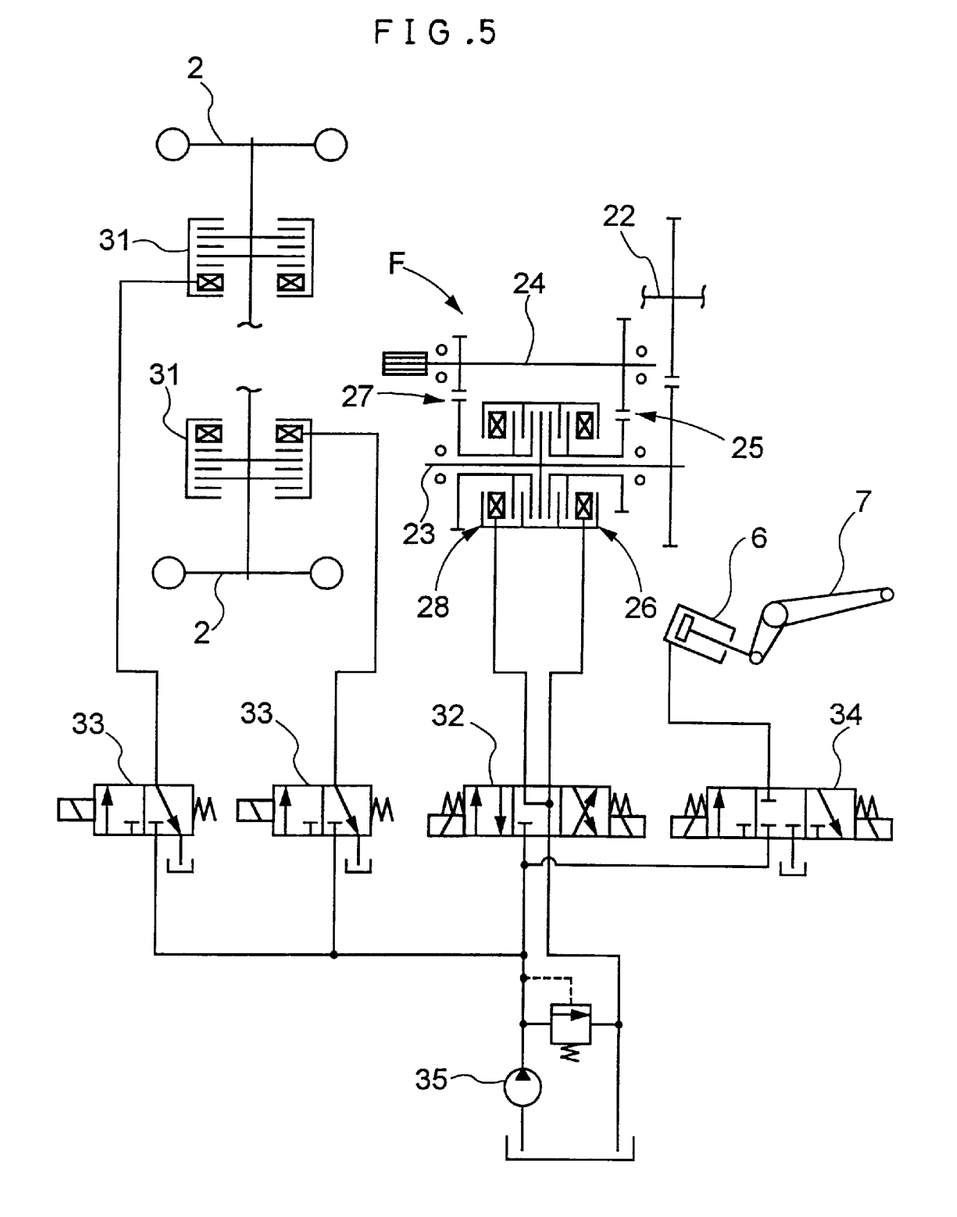
FIG. 5 is a schematic view of a hydraulic system.

As shown in FIGS. 3 and 4, a front wheel change speed device F is mounted in the transmission case 5. The front wheel change speed device F is operable to provide a standard state for driving the front wheels 1 at a substantially equal peripheral speed to the rear wheels 2, an accelerating state for driving the front wheels 1 at a substantially faster peripheral speed than the rear wheels 2 so that the tractor may make a turn with a small radius, and a two wheel driving state for breaking power transmission to the front wheels 1.

In the standard state, the front wheels 1 are driven at "substantially" the same peripheral speed as the rear wheels 2. In this state, a difference in peripheral speed between the front wheels 1 and rear wheels 2 desirably is within an error range of 5%. It is preferable that the front wheels 1 are driven at a peripheral speed 2 to 3% faster than the rear wheels 2.

In the accelerating state, the front wheels 1 are driven at a "substantially" faster peripheral speed than the rear wheels 2. This means that the front wheels 1 are driven at a peripheral speed at least 30% faster than the rear wheels 2. Preferably, the front wheels 1 are driven, in this state, at a peripheral speed 50 to 100% faster than the rear wheels 2.

The front wheel change speed device F has an intermediate shaft 23 interlocked through gears to a final change speed shaft 22 which transmits power from a propelling change speed device 20 to a rear differential 21, a front wheel drive shaft 24 extending parallel to the intermediate shaft 23, a friction type multidisk standard clutch 26 for transmitting power from the intermediate shaft 23 to the front wheel drive shaft 24 through a standard gear mechanism 25, and a friction type multidisk accelerating clutch 28 for transmitting power from the intermediate shaft 23 to the front wheel drive shaft 24 through an accelerating gear mechanism 27. The standard clutch 26 and accelerating clutch 28 are engageable by pressure oil supplied thereto. Power is transmitted from the front wheel drive shaft 24 to a front differential 30 through a transmission shaft 29.

As shown in FIG. 4, side brakes 31 are provided for braking the right and left rear wheels 2 independently of each other. Each side brake 31 is the multidisk friction type operable by pressure oil supplied thereto for producing a braking force. An electromagnetically operable clutch control valve 32 is provided for supplying and draining the pressure oil to/from the standard clutch 26 and accelerating clutch 27. Electromagnetically operable brake control valves 33 are provided for controlling the right and left side brakes 31, respectively. An electromagnetically operable lift control valve 34 is provided for controlling the pressure oil supplied to the lift cylinder 6. Pressure oil is supplied to these valves 32, 33 and 34 from a hydraulic pump 35 driven by the engine 3.

As shown in FIG. 3, a steering sensor 36 having a potentiometer is provided for measuring a steering amount of the front wheels 1. Further, brake sensors 37 are disposed adjacent the right and left side brake pedals 18 for detecting depression thereof. A pickup type vehicle speed sensor 38 is disposed adjacent a gear mounted on the final change speed shaft 22 for measuring a running speed of the tractor.

The tractor includes a dial type drive mode setter 39 for selecting a drive mode. This drive mode setter 39 may be set selectively to a two wheel drive mode "2WD" for driving only the rear wheels 2, a standard four wheel drive mode "4WD" for providing the standard state noted hereinbefore, a double speed mode "double-speed" for switching the front wheel change speed device F from the standard state to the accelerating state when the front wheels 1 are steered in excess of a predetermined reference angle, and a double-speed automatic braking mode "double-speed/AD" for switching the front wheel change speed device F to the accelerating state and operating the side brake 31 of the rear wheel 2 lying inwardly of the turn when the front wheels 1 are steered in excess of the reference angle. As used herein, the "accelerating state" and "double-speed" have the same meaning. However, as noted hereinbefore, the "double-speed" does not necessarily mean that the front wheels 1 are driven at twice the speed of the rear wheels 2.

The tractor further includes an operating mode setter 40 for selecting an operating mode. The operating mode setter 40 is operable, in "A" position, to select an automatic cultivating depth control mode for controlling the height of rotary cultivator R in response to a result of detection by the cover sensor 14. In "D" position, a draft control mode is selected for controlling the height of plow P in response to a result of detection by the draft sensor 16. In "P" position, a position control mode is selected for controlling the height of the working implement in response to a control position of the position lever 10.

Figure 6:
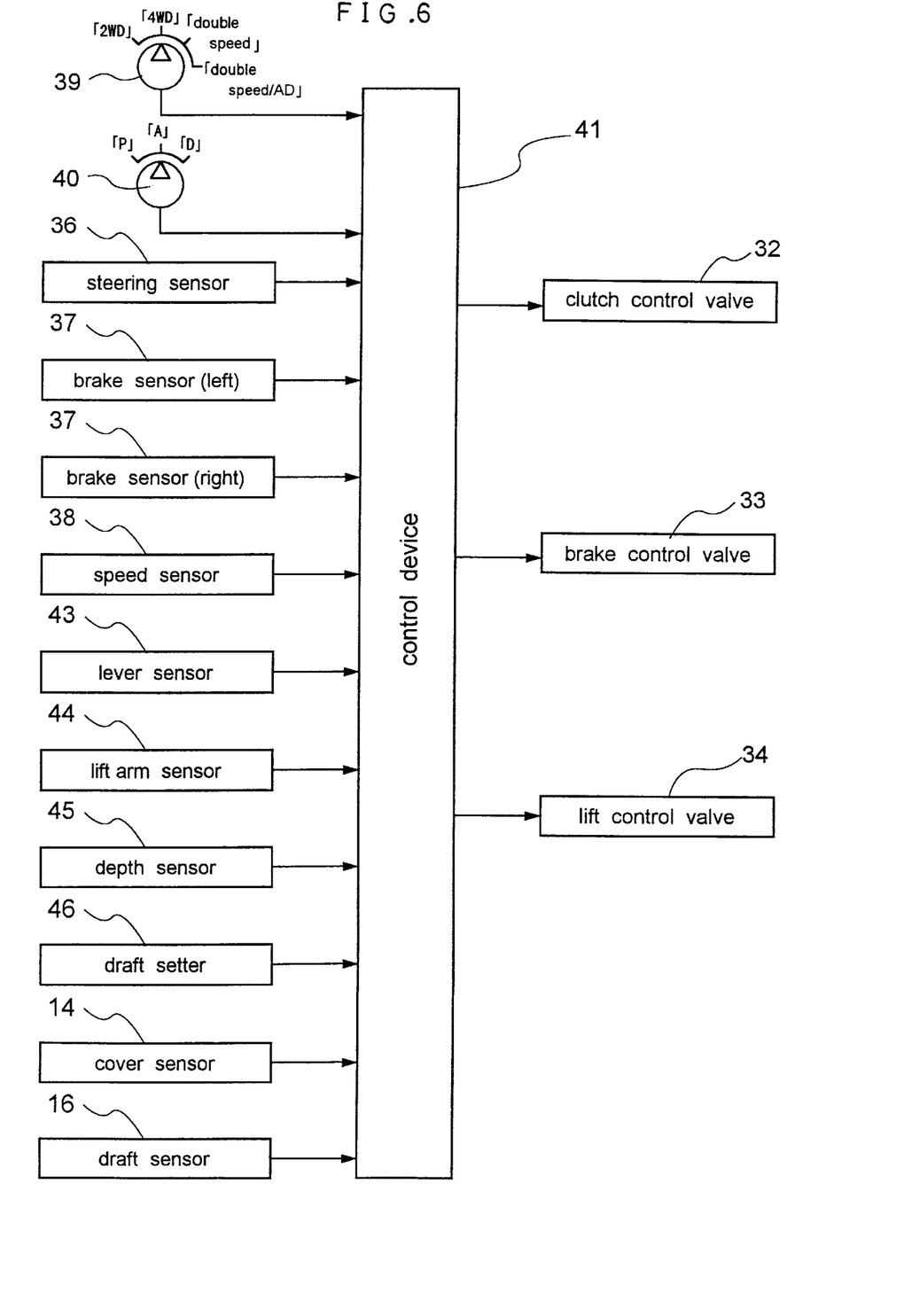
FIG. 6 is a block diagram of a control system.

The tractor includes a controller 41 having a microprocessor. The controller 41 receives signals from the drive mode setter 39, operating mode setter 40, steering sensor 36, right and left brake sensors 37, vehicle speed sensor 38, a potentiometer type lever sensor 43 for measuring a control position of position lever 11, a potentiometer type lift arm sensor 44 for measuring a pivoting amount of lift arms 7, a potentiometer type cultivating depth setter 45 for setting a target cultivating depth of rotary cultivator R, a draft setter 46 for setting a plowing depth of plow P as a draft load value, the cover sensor 14 and draft sensor 16. The controller 41 outputs signals to the clutch control valve 32, brake control valves 33 and lift control valve 34.

The controller 41 has programs set thereto for raising or lowering the rotary cultivator R or plow P in a control mode selected by switching the operating mode setter 40.

In the position control mode, the lever sensor 43 outputs a signal based on a control position of position lever 11 and setting a target height relative to the vehicle body. Then, the rotary cultivator R is vertically moved until the signal value measured by the lift arm sensor 44 reaches the target height (including a deadband).

In the automatic cultivating depth control mode, the cultivating depth setter 45 sets a target cultivating depth with reference to the ground, and the rotary cultivator R is vertically moved to maintain an actual cultivating depth measured by the cover sensor 14 at the target cultivating depth (including a deadband). In this case, the position lever 11 has to be set to a position lower than the target cultivating depth, e.g. to a lowermost position. That is, the position control mode and automatic cultivating depth control mode correspond to a rotary cultivation operating mode.

In the draft control mode, the plow P is vertically moved to maintain a load detected by the draft sensor 16 at a target load (including a deadband) set by the draft setter 46. In this case, a height (relative to the vehicle body) of the working implement selected by the position lever 11 provides a lower limit.

Figure 7:
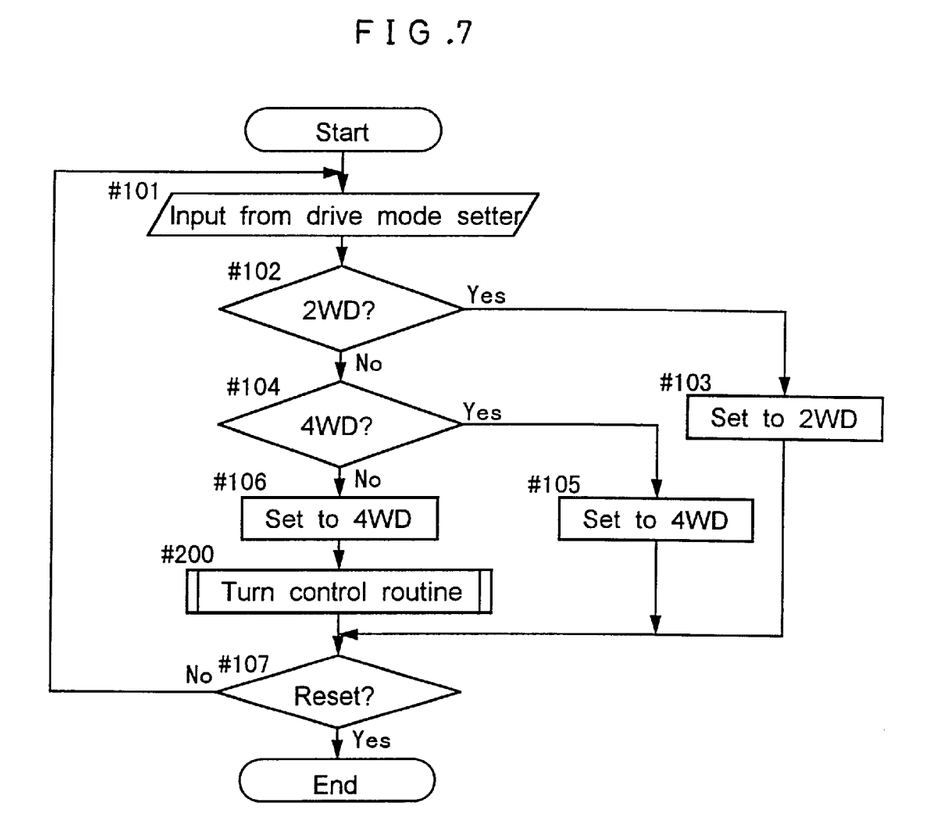
FIG. 7 is a flow chart of a main control routine.
Figure 8:
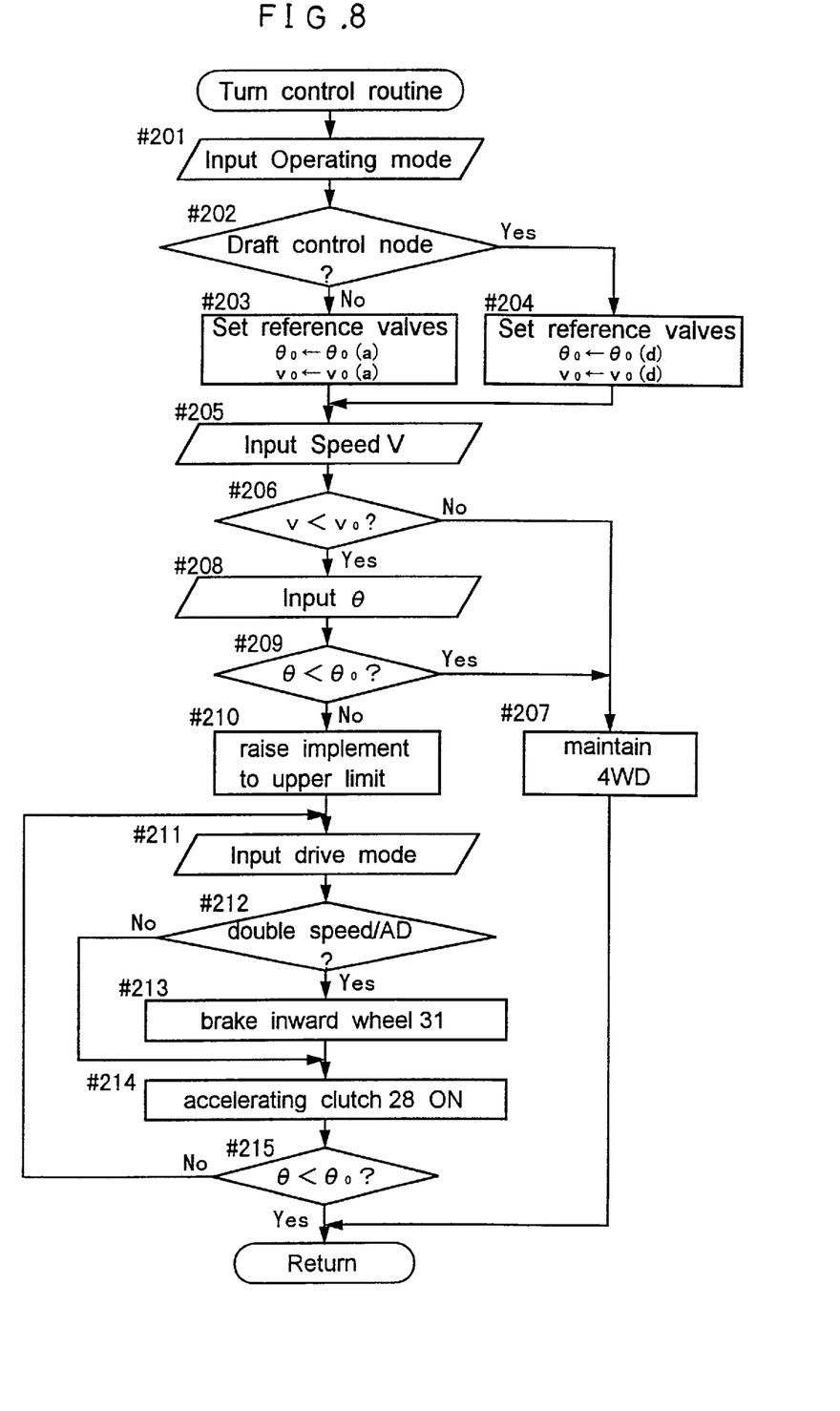
FIG. 8 is a flow chart of a turn control routine.

The controller 41 is programmed to execute, besides the lift control of the working implement in a selected control mode, controls of front wheel change speed device F and side brakes 31, and an auto up control. FIGS. 7 and 8 show flow charts of these control operations.

As shown in FIG. 7, the controller 41 first reads a selected drive mode from the drive mode setter 39 at step #101. At steps #102 and #103, when the two wheel drive mode "2WD" is selected, the controller 41 operates the clutch control valve 32 to neutral position to maintain the state of no power transmission to the front wheels 1. When the drive mode setter 39 selects the standard four wheel drive mode "4WD", the controller 41 drives the clutch control valve 32 to maintain the four wheel drive mode (#102 to #105). Also when the drive mode setter 39 selects a different mode, i.e. the double speed mode "double-speed" or double-speed automatic braking mode "double-speed/AD", the clutch control valve 32 is operated to maintain the four wheel drive mode (#106). When the drive mode setter 39 selects the double speed mode "double-speed" or double-speed automatic braking mode "double-speed/AD", a turn control routine is executed (#200). The above control is maintained until a resetting operation is made (#107).

Though not shown in the flow chart, the control operation of controller 41 is set such that, when one of the brake sensors 37 indicates that the right or left side brake pedal 18 has been depressed, the controller 41 drives the brake control valve 33 corresponding to that side brake pedal 18 to actuate the corresponding side brake 31.

The turn control routine (#200) will particularly be described with reference to the flow chart shown in FIG. 8. First, an operating mode selection is read (#201). The steering angle (reference angle $\theta 0$) for providing a reference in accelerating the front wheels 1 is set to a different value according to an operating mode selected by the operating mode setter 40. That is, when the automatic cultivating depth control mode "A" or position control mode "P" is selected, the reference angle $\theta 0$ is set to a first reference angle $\theta 0(a)$ (#202 and #203). When the draft control mode "D" is selected, the reference angle $\theta 0$ is set to a second reference angle $\theta 0(d)$ (#202 and #204). The second reference angle $\theta 0(d)$ for the draft control mode "D" is given beforehand a larger value than the first reference angle $\theta 0(a)$ for the automatic cultivating depth control mode "A" and position control mode "P" [$\theta 0(d) > \theta 00(a)$].

The controller 41 is programmed to inhibit the control for accelerating the front wheels 1 in time of high-speed running when running speed v equals or is higher than reference speed v0. The reference speed v0 is set to a different value according to an operating mode selected by the operating mode setter 40. That is, when the automatic cultivating depth control mode "A" or position control mode "P" is selected, the reference speed v0 is set to a first reference speed v0(a) (#202 and #203). When the draft control mode "D" is selected, the reference speed v0 is set to a second reference speed v0(d) (#202 and #204). The second reference speed v0(d) for the draft control mode "D" is given beforehand a larger value than the first reference speed v0(a) for the automatic cultivating depth control mode "A" and position control mode "P" [$v0(d) > v0(a)$].

Next, the controller 41 reads an actual running speed v from the speed sensor 38, and compares the actual running speed v with the reference speed v0 (#205 and #206). When running speed v is found equal to or higher than the reference speed v0 ($v \geq v0$), the tractor is simply maintained in the four wheel drive mode (#207). When the running speed v is found lower than the reference speed v0 ($v < v0$), the controller 41 executes the auto up control for raising the working implement and a small turn control noted hereinafter.

In the small turn control, the controller 41 first reads a steering angle $\theta$ of front wheels 1 from the steering sensor 36, and compares the steering angle with the reference angle $\theta 0$ (#208 and #209). When the steering angle $\theta$ detected is found smaller than the reference angle θ0 (θ<θ0), the tractor is simply maintained in the four wheel drive mode (#207). When the steering angle θ is found equal to or larger than the reference angle θ0 (θ≧θ0), the auto up control is executed in which the controller 41 drives the lift control valve 34 to operate the lift cylinder 6 for raising the rotary cultivator R or plow P to a predetermined height above an operating level (e.g. to an upper limit) (#210).

After the auto up control, the controller 41 reads a selection made by the drive mode setter 39, to determine which of "double-speed/AD" and "double-speed" is selected (#212). When "double-speed/AD" is selected, the brake control valve 33 inward of the turn is driven to operate the corresponding side brake 31, and the clutch control valve 32 is driven to engage the accelerating clutch 28 of the front wheel change speed device F. As a result, a small turn is made by front wheel acceleration and inward wheel braking (#212 to #214). When "double-speed" is selected, the accelerating clutch 28 of the front wheel change speed device F is engaged to make a small turn based on front wheel acceleration without being accompanied by inward wheel braking (#212 to #214). When the steering angle θ of front wheels 1 returns to be smaller than the reference angle θ0 (θ<θ0), the accelerating clutch 28 is disengaged to reinstate the standard four wheel drive mode (#201 to #207).

The above embodiment may be modified such that the auto up control, which automatically raises the working implement to the predetermined height above the operating level based on a determination that the steering angle θ is equal to or larger than the reference angle θ0, may be executed also in the two wheel drive mode "2WD" and four wheel drive mode "4WD".

What is claimed is:

1. An agricultural tractor comprising:
    an engine;
    rear wheels driven by said engine;
    dirigible front wheels drivable by said engine;
    front wheel change speed means switchable between a standard state for driving said front wheels at a substantially equal peripheral speed to said rear wheels, and an accelerating state for driving said front wheels at a substantially higher speed than said rear wheels;
    operating mode selecting means for selecting from a plurality of operating modes;
    reference angle setting means operable, in response to a mode switching operation of said operating mode selecting means, for automatically selecting one of a first reference angle and a second reference angle different from said first reference angle; and
    front wheel change speed control means operable, upon detection of said front wheels being steered in excess of a selected one of said first reference angle and said second reference angle, for switching said front wheel change speed means from said standard state to said accelerating state.

2. An agricultural tractor as defined in claim 1, wherein said plurality of operating modes includes a draft control mode.

3. An agricultural tractor as defined in claim 1, wherein said plurality of operating modes includes a rotary cultivating mode.

4. An agricultural tractor as defined in claim 1, wherein said plurality of operating modes includes a position control mode.

5. An agricultural tractor as defined in claim 1, further comprising auto up control means operable, upon detection of said front wheels being steered in excess of said selected one of said first reference angle and said second reference angle, for automatically raising a working implement coupled to a rear position of said tractor to a non-operating height.

6. An agricultural tractor as defined in claim 2, wherein said reference angle setting means sets said second reference angle corresponding to said draft control mode to be larger than said first reference angle corresponding to other operating mode.

7. An agricultural tractor comprising:
    an engine;
    rear wheels driven by said engine;
    dirigible front wheels drivable by said engine;
    front wheel change speed means switchable between a standard state for driving said front wheels at a substantially equal speed to said rear wheels, and an accelerating state for driving said front wheels at a substantially higher speed than said rear wheels;
    front wheel change speed control means operable, upon detection of said front wheels being steered in excess of a predetermined reference angle, for switching said front wheel change speed means from said standard state to said accelerating state;
    operating mode selecting means for selecting between a rotary cultivating mode and a draft control mode;
    reference speed setting means operable, in response to a mode switching operation of said operating mode selecting means, for automatically selecting one of a first reference speed corresponding to said rotary cultivating mode and a second reference speed corresponding to said draft control mode; and
    front wheel change speed restraining means operable, upon detection of a running speed of the tractor being higher than a selected one of said first reference speed and said second reference speed, for inhibiting switching of said front wheel change speed device from said standard state to said accelerating state.

8. An agricultural tractor as defined in claim 7, wherein said reference speed setting means is operable for setting said second reference speed corresponding to said draft control mode to be higher than said first reference speed corresponding to said rotary cultivating mode.

9. An agricultural tractor as defined in claim 7, further comprising auto up control means operable, upon detection of said front wheels being steered in excess of said selected one of said first reference angle and said second reference angle, for automatically raising a working implement coupled to a rear position of said tractor to a non-operating height.

10. An agricultural tractor comprising:
    an engine;
    rear wheels driven by said engine;
    dirigible front wheels drivable by said engine;
    operating mode selecting means for selecting from a plurality of operating modes; and
    reference angle setting means operable, in response to a mode switching operation of said operating mode selecting means, for automatically selecting one of a first reference angle and a second reference angle different from said first reference angle; and
    auto up control means operable, upon detection of said front wheels being steered in excess of a reference angle when said draft control mode is selected by said operating mode selecting means, for automatically raising a working implement coupled to a rear position of said tractor to a non-operating height.

11. An agricultural tractor as defined in claim 10, wherein said plurality of operating modes includes a draft control mode.

12. An agricultural tractor as defined in claim 10, wherein said plurality of operating modes includes a rotary cultivating mode.

13. An agricultural tractor as defined in claim 10, wherein said plurality of operating modes includes a position control mode.

14. An agricultural tractor as defined in claim 11, wherein said reference angle setting means sets said second reference angle corresponding to said draft control mode to be larger than said first reference angle corresponding to other operating mode.

15. An agricultural tractor as defined in claim 10, further comprising front wheel change speed means switchable between a standard state for driving said front wheels at a substantially equal speed to said rear wheels, and an accelerating state for driving said front wheels at a higher speed than said rear wheels.

16. An agricultural tractor comprising:

an engine;

rear wheels driven by said engine;

dirigible front wheels drivable by said engine;

front wheel change speed means switchable between a standard state for driving said front wheels at a substantially equal speed to said rear wheels, and an accelerating state for driving said front wheels at a substantially higher speed than said rear wheels;

front wheel change speed control means operable, upon detection of said front wheels being steered in excess of a predetermined reference angle, for switching said front wheel change speed means from said standard state to said accelerating state;

operating mode selecting means for selecting between a rotary cultivating mode and a draft control mode;

reference angle setting means operable, in response to a mode switching operation of said operating mode selecting means, for setting said reference angle to one of a first reference angle corresponding to said rotary cultivating mode and a second reference angle corresponding to said draft control mode;

reference speed setting means operable, in response to said mode switching operation, for selecting one of a first reference speed corresponding to said rotary cultivating mode and a second reference speed corresponding to said draft control mode; and auto up control means operable, upon detection of said front wheels being steered in excess of selected one of said first and second reference angles, for automatically raising a working implement coupled to a rear position of said tractor to a non-operating height front wheel change speed restraining means operable, upon detection of a running speed of the tractor being higher than a selected one of said first reference speed and said second reference speed, for inhibiting switching from said standard state to said accelerating state.

17. An agricultural tractor as defined in claim 16, wherein said second reference angle and said second reference speed corresponding to said draft control mode are set larger/ higher than said first reference angle and said first reference speed corresponding to said rotary cultivating mode.

* * * * *